United States Patent
Buyukkokten

(10) Patent No.: US 9,600,297 B1
(45) Date of Patent: Mar. 21, 2017

(54) DETERMINING INTERACTION CONTEXT BY PROVIDING AND USING PERSONAS

(71) Applicant: Google Inc., Mountain View, CA (US)

(72) Inventor: Orkut Buyukkokten, Mountain View, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/663,268

(22) Filed: Oct. 29, 2012

(51) Int. Cl.
*G06F 9/44* (2006.01)
*G06F 3/0481* (2013.01)

(52) U.S. Cl.
CPC .......... *G06F 9/4443* (2013.01); *G06F 3/0481* (2013.01); *G06F 8/38* (2013.01)

(58) Field of Classification Search
None
See application file for complete search history.

(56) References Cited

U.S. PATENT DOCUMENTS

| | | | | |
|---|---|---|---|---|
| 8,375,331 | B1* | 2/2013 | Mayers | 715/835 |
| 2006/0184578 | A1* | 8/2006 | La Rotonda | G06Q 10/10 |
| 2008/0019353 | A1* | 1/2008 | Foote | 370/352 |
| 2008/0082421 | A1* | 4/2008 | Onyon | G06Q 30/02 |
| | | | | 705/14.19 |
| 2008/0104172 | A1* | 5/2008 | Craig | H04L 67/306 |
| | | | | 709/204 |
| 2008/0182563 | A1* | 7/2008 | Wugofski | G06Q 10/10 |
| | | | | 455/414.2 |
| 2009/0327305 | A1* | 12/2009 | Roberts et al. | 707/10 |
| 2010/0042680 | A1* | 2/2010 | Czyzewicz | G06Q 10/10 |
| | | | | 709/203 |
| 2010/0281427 | A1* | 11/2010 | Ghosh et al. | 715/811 |
| 2011/0022621 | A1* | 1/2011 | Luo | G06Q 30/02 |
| | | | | 707/769 |
| 2011/0053574 | A1* | 3/2011 | Rice | H04M 1/006 |
| | | | | 455/418 |
| 2013/0036177 | A1* | 2/2013 | Leeder et al. | 709/206 |
| 2013/0104070 | A1* | 4/2013 | Blake et al. | 715/777 |
| 2013/0310003 | A1* | 11/2013 | Sadhvani | H04W 12/06 |
| | | | | 455/411 |
| 2013/0326362 | A1* | 12/2013 | Murray | G06Q 10/10 |
| | | | | 715/750 |
| 2014/0095852 | A1* | 4/2014 | Levi | G06F 9/44 |
| | | | | 713/1 |

* cited by examiner

*Primary Examiner* — Matt Kim
*Assistant Examiner* — Mahelet Shiberou
(74) *Attorney, Agent, or Firm* — Patent Law Works LLP

(57) ABSTRACT

In some implementations, this technology includes systems and methods for creating, incorporating, or providing multiple personas (e.g., based on an interest, hobby, identity, profession, or the like) for users of an online community, e.g., a social network. The multiple personas have an interaction context including profile data, connections, groups, and applications that are specific to each persona type. User connections, user content, and user applications for a particular user are determined based on a particular persona type and its context. In addition, user communications are associated with a persona type. A persona type may be selected by a particular user or a user group.

21 Claims, 11 Drawing Sheets

DETERMINING INTERACTION CONTEXT BY PROVIDING AND USING PERSONAS

The present disclosure relates to providing multiple personas, and providing an interaction context including user content, connections, profiles, or applications, based on a particular persona type selected from the multiple personas.

In the last decade, social networks have become increasingly popular, facilitating a way for people to connect, communicate, or otherwise share activities and interests. Social networks typically bring together users who belong to a particular community. Yet, the particular community may be as expansive as including practically all internet users, with a myriad of diverse interests, or as narrow as including only those interested in pursuing a specific interest (e.g., fishing in Fisherman Park in Burlingame). In the event users have many different interests or activities, they must typically belong to different social networks or online communities to satisfy their different interests and activities. Users join different social networks based on demographics. As an example, users of online communities, typically sign up to multiple online services to satisfy their goals; they join a professional social network for business networking, a movie social network for exchanging dialog about movies, a dating service to find romance, and so on.

SUMMARY

According to one innovative aspect of the subject matter described in the disclosure, a system having one or more processors and a memory configured to perform operations including receiving input from a user; identifying from the received input, using at least one computing device, the user and a first persona from one or more personas for the user; determining a context corresponding to the identified first persona, the context including a user interface and a connection; and providing the context for user interaction with a social network.

In general, another innovative aspect of the subject matter described in this disclosure may be embodied in a method including: receiving input from a user; identifying from the received input, using at least one computing device, the user and a first persona from one or more personas for the user; determining a context corresponding to the identified first persona, the context including a user interface and a connection; and providing the context for user interaction with a social network.

Other implementations of one or more of these aspects include corresponding systems, apparatus, and computer programs, configured to perform the actions of the methods, encoded on computer storage devices.

These and other implementations may each optionally include one or more of the following features. For instance, a context including one or more from the group of an application, a social graph, a user interface, a contact group, a profile, communications and content specific to the identified persona; the user interface enables the user to switch from the context corresponding to the identified first persona to a second context corresponding to a second persona; operations further include filtering, using the at least one computing device, connections of the user to other users in the social network, profile information and content, based at least in part on the identified first persona; operations further include providing for display to the user, using the at least one computing device, connections and content that determined to be relevant to the identified first persona, and providing them in a specific user interface corresponding to the identified first persona; operations further include determining one or more applications for use by the user based, at least in part, on the particular persona of the particular user; and operations further include selecting a persona for the user, based at least in part on one from a group of a user location, a user preference, a user interest, a user identity, a user role in society, and a user function in society.

The systems and methods disclosed below are advantageous in a number of respects. With the ongoing trends and growth in social network communication, it may be beneficial to generate "multiple" persona types for users (e.g., based on interest, identity, etc.), permitting users to view and communicate with user connections (i.e., other users with whom a particular user shares connections), user content or information, and applications, filtered by persona type within a social network. In this way, users avoid managing multiple different social accounts and connections simultaneously and therefore save unnecessary time and effort spent in duplicating information on the different accounts.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
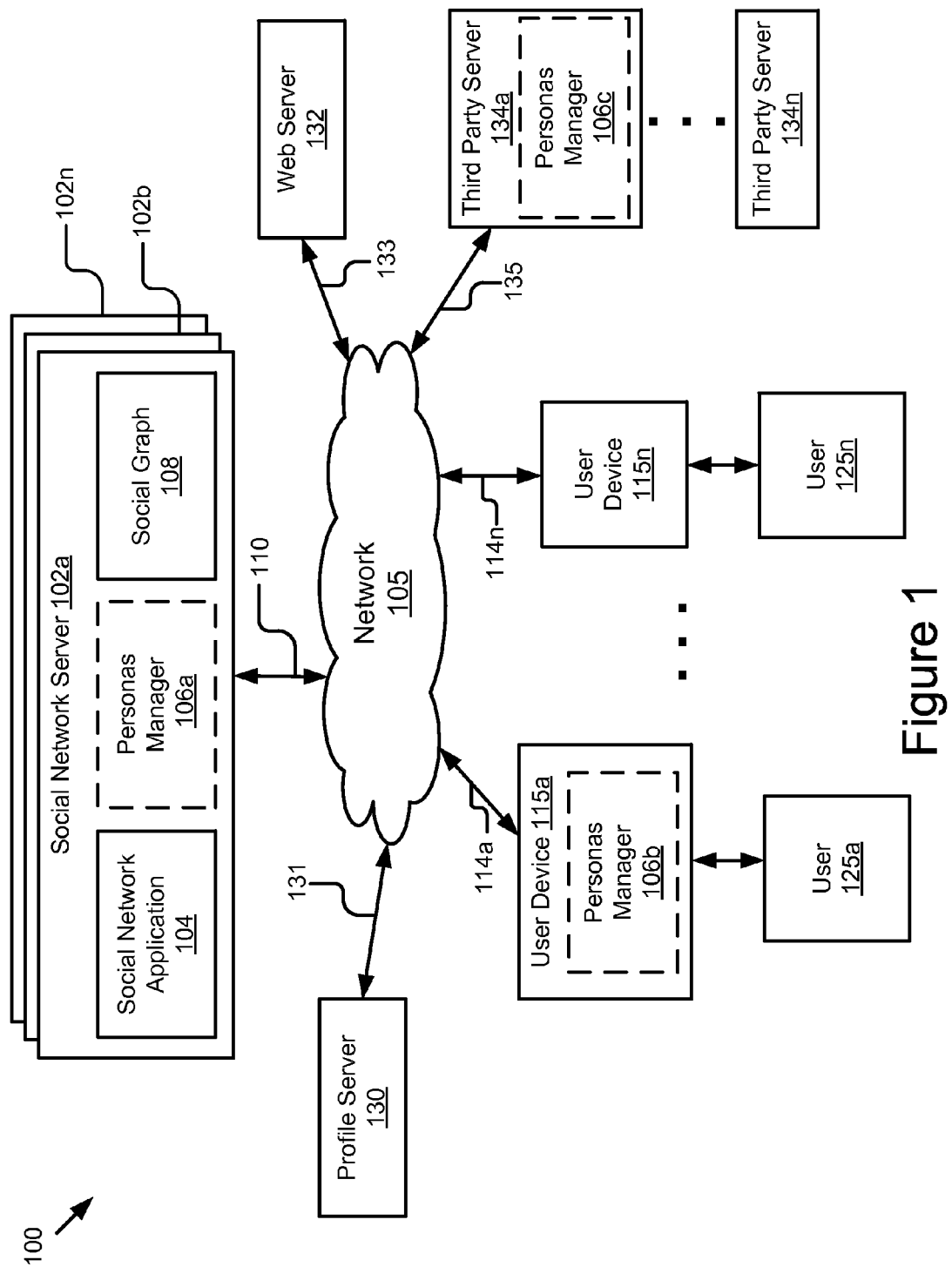
FIG. 1 is block diagram illustrating an example system for providing personas and filtering user connections, content, and applications based on a particular persona type selected from multiple personas provided by a personas manager.

In some implementations, this technology includes systems and methods for creating and incorporating or otherwise providing "multiple" personas or persona types (e.g., based on an interest, hobby, identity, profession, or the like)

for users of an online community, e.g., a social network. The systems and methods also include use of these personas in processing and providing information to the user. For example, depending on the persona of the user, different applications, social graphs, contact groups, connections, user interfaces, profiles, communication and content may be used or made available. Reference to a "persona" in this specification and the drawings represents a community. A community may be all-encompassing (i.e., users of a particular service), or based on demographics (i.e., users in the same country, belonging to the same age group or same religion, etc.), identity (users who are bachelors, parents, celebrities, etc.), a hobby or profession (i.e., photography, dancing, playing football or soccer, etc.), a fantasy (i.e., pirates, vampires, etc.), an activity (i.e., barbeques, parties, people watching, etc.) or any other criteria. The "multiple" personas have their own persona-specific content, profile data, social graphs, user interfaces and applications. Example personas may include: Base, Actor, Animal Lover, Anime Fan, Architect, Artist, Athlete, Attorney, Bachelor, Bartender, Baseball Fan, Basketball Fan, Beer Lover, Board Gamer, Burner, Car Buff, Cat Owner, Cheerleader, Chef, Climber, Clubber, Comedian, Comic Fan, Couch Potato, Crafter, Crime Fighter, Cyclist, Dancer, DJ, Dog Owner, Engineer, Entrepreneur, Entertainer, Environmentalist, Fashion Enthusiast, Film Maker, Firefighter, Fisherman, Fitness Buff, Foodie, Football Fan, Gadget Lover, Gambler, Gamer, Gardener, Geek, Genealogist, Golfer, Health Enthusiast, History Buff, Home Designer, Investor, Martial Artist, Massage Therapist, Medic, Model, Motorcyclist, Movie Fan, Music Fan, Musician, Outdoorsman, Parent, People Watcher, Philosopher, Photographer, Pilot, Pirate, Police Officer, Politico, Professional, Reader, Runner, Scholar, Scientist, Sci-Fi Fan, Scuba Diver, Serviceman, Shopper, Skateboarder, Skier, Snowboarder, Soccer Fan, Sports Fan, Student, Stylist, Surfer, Teacher, Techie, Traveler, TV Fan, Vampire, VIP, Volunteer, Wine Lover, Writer and Yoga Lover. It should be understood that some embodiments, may have fewer, more or different personas that those listed above.

The systems and methods of this technology process (e.g., filter) user connections (e.g., friends of a particular user) for a particular user based on a particular persona type selected by the particular user and its context. In some instances, a particular user may only view a list of "friends" filtered as relevant to the particular persona type selected by the particular user. As one example, a user with a "gamer" persona type may only view his or her friends who are also gamers. In addition, the systems and methods may associate user communications to a particular persona type selected, and filter user groups and applications associated with the persona type.

A particular user may establish "multiple" personas or persona types, for example, by joining multiple persona types offered by a social network. In some instances, a social network may provide a limit on how many different personas a particular user may join, yet in other instances, it may not. In some instances, the number of personas available to a particular user may be revealed gradually. Personas may be created by administrators of a social network, users of the social network, or both, depending on how a social network is configured.

This technology provides a user interface via which particular users may select from multiple persona types. The user interface includes a navigational element configured to permit a particular user to switch among personas (i.e., change from a current persona to another). Components like the profile, friends list, applications, and groups, may be filtered or selected based, at least in part, on the "current" persona type.

FIG. 1 is a block diagram illustrating some implementations of system architecture for incorporating "multiple" personas in a social network and for filtering one or more of user connections, content, and applications, based on a particular persona type selected by a particular user. The system 100 includes one or more social network servers 102*a*, 102*b*, through 102*n*, which may be accessed via user devices 115*a* through 115*n*, which in turn are used by users 125*a* through 125*n*, to connect to any one of the social network servers 102*a*, 102*b*, through 102*n*. These entities are communicatively coupled via a network 105.

Moreover, while the present disclosure is described below primarily in the context of filtering one or more of user connections, content, and applications, based on a persona type for a particular user, the present disclosure may be applicable to other situations where filtering connections or content or applications for any purpose that is not related to personas, is necessary or desired. For ease of understanding and brevity, the description of the present disclosure is described only in reference to filtering one or more of user connections, content, and applications based on a selected persona.

The user devices 115*a* through 115*n* in FIG. 1 are illustrated by way of example. Although FIG. 1 illustrates only two devices, the present disclosure applies to any system architecture having one or more user devices 115, therefore, any number of user devices 115*n* may be used. Furthermore, whereas only one network 105 is illustrated as coupled to the user devices 115*a* through 115*n*, the social network servers, 102*a*-102*n*, the profile server 130, the web server 132, and third party servers 134*a* through 134*n*, in practice, any number of networks 105 may be connected to these entities. In addition, although only two third party servers 134*a* through 134*n* are shown, the system 100 may include any number of third party servers 134*n*.

In some implementations, the social network server 102*a* is coupled to the network 105, via a signal line 110. The social network server 102*a* includes a social network application 104, which includes the software routines and instructions to operate the social network server 102*a* and its functions and operations. Although only one social network server 102*a* is described here, multiple servers may be present, as illustrated by social network servers 102*b* through 102*n*, each with functionality similar to social network server 102*a* or different.

The term "social network" as used here includes, but is not limited to, any type of social structure where the users are connected by a common feature or link. The common feature includes relationships/connections, e.g., friendship, family, work, a similar interest, etc. The common features are provided by one or more social networking systems, for example, those included in the system 100, including explicitly-defined relationships and relationships implied by social connections with other online users, where the relationships form the social graph 108.

The term "social graph" as used here includes, but is not limited to, a set of online relationships between users, provided by one or more social networking systems, for example, the social network system 100, including explicitly-defined relationships and relationships implied by social connections with other online users, where the relationships form a social graph 108. In some examples, the social graph 108 may reflect a mapping of these users and how they are related.

It should be understood that the social network server 102a and the social network software/application 104 are representative of a single social network. Each of the plurality of social network servers 102a, 102b through 102n, is coupled to the network 105, each having its own server, application, and social graph. For example, a first social network hosted on a social network server 102a may be directed to business networking, a second on a social network server 102b directed to or centered on academics, a third on a social network server 102c (not shown) directed to local business, a fourth on a social network server 102d (not shown) directed to dating, and yet others on social network server (102n) directed to other general interests or perhaps a specific focus.

A profile server 130 is illustrated as a stand-alone server in FIG. 1. In some implementations of the system architecture 100, all or part of the profile server 130 may be part of the social network server 102a. The profile server 130 is connected to the network 105, via a line 131. The profile server 130 has profiles for all the users that belong to a particular social network 102a-102n. One or more third party servers 134a through 134n are connected to the network 105, via signal line 135. A web server 132 is connected, via line 133, to the network 105. The web server 132 provides access by one or more of the user devices 115a through 115n, to the social network servers 102a through 102n, or one or more of the third party servers 134a through 134n.

The social network server 102a includes a personas manager 106a, to which user devices 115a through 115n are coupled, via the network 105. In particular, user device 115a is coupled, via line 114a, to the network 105. The user 125a, via the user device 115a, accesses any one of the social networks 102a through 102n, and the personas manager 106a (illustrated in the social network server 102a) provides options to the user 125a, to select a particular persona from multiple persona types. The persona manager 106a may be configured as an "application" or certain components of it may be stored in a distributed architecture in any of the social network server 102a, the third party server 134a (illustrated as 106bc), or the user device 115a (illustrated as 106B). In some implementations, the persona manager 106 (a, b, or c) may be included entirely, in any one or more of the social network servers 102 (a, b through n), the third party server 134 (a through n), and the user device 115 (a through n).

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations, for example, a star configuration, token ring configuration, or other configurations. Furthermore, the network 105 may include a local area network (LAN), a wide area network (WAN, e.g., the Internet), and/or any other interconnected data path across which one or more devices may communicate.

In some implementations, the network 105 may be a peer-to-peer network. The network 105 may also be coupled to or include portions of one or more telecommunications networks for sending data in a variety of different communication protocols.

In some implementations, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third party servers 134a through 134n are hardware servers including a processor, memory, and network communication capabilities. One or more of the users 125a through 125n access any of the social network servers 102a through 102n, via browsers in their user devices and via the web server 132.

As one example, in some implementations of the system architecture, information on particular users (125a through 125n) of a social network 102a through 102n is retrieved from the social graph 108. It should be noted that any information that is retrieved for particular users is only upon obtaining the necessary permissions from the users 102a through 102n, in order to protect user privacy and any sensitive information of the users. User content is retrieved from one or more the social network servers 102a through 102n, the profile server 130, the web server 132, and the third party servers 134a through 134n. The personas manager 106a is configured to filter one or more of user connections, content, and applications based on a persona type selected by a particular user (any one of users 125a through 125n).

Figure 2A:
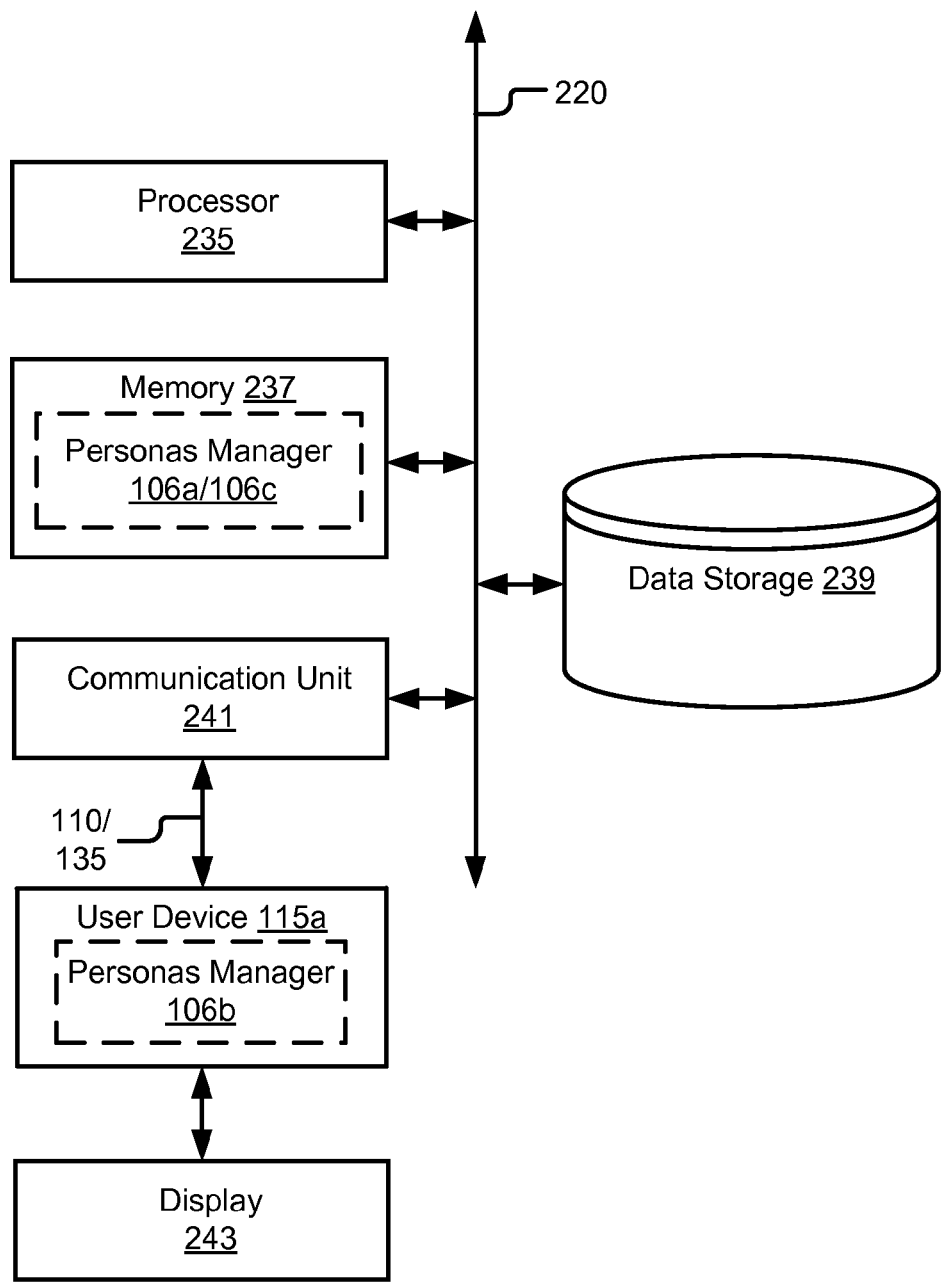
FIG. 2A is a block diagram illustrating an example social network server or example third party server with an example personas manager, including its hardware components.

FIG. 2A is a block diagram illustrating some implementations of a social network server 102a through 102n and third party server 134a through 134n, indicated generally by reference numeral 200, and including the personas manager 106a. In FIG. 2, like reference numerals have been used to reference like components with the same or similar functionality that has been described above with reference to FIG. 1. Since those components have been described above that description is not repeated here. The system 200 generally includes one or more processors, although only one processor 235 is illustrated in FIG. 2. The processor is coupled, via a bus 220, to memory 237 and data storage 239. In some implementations, the data storage 239 is a database organized by a user (any one or more of users 125a through 125n) of the social network or by administrators of the social network (102a through 102n). In some implementations, the personas manager 106a/106c is stored in the memory 237. A particular user 125a, via a user device 115a, may either join, access, or change personas, via communication unit 241. The personas manager (106a, 106b, and 106c) may reside, in their entirety or parts of them, in the user's device (115a through 115n), in the social network server 102a (through 102n), or alternatively, in a separate server, for example, the third party server 134 (FIG. 1). The user device 115a communicates with the social network server 102a via communication unit 241, via signal lines 110 or 135. Persona types for selection by a particular user 125a through 125n are provided for display on a display 243 associated with any of the user devices 115a through 115n.

Figure 2B:
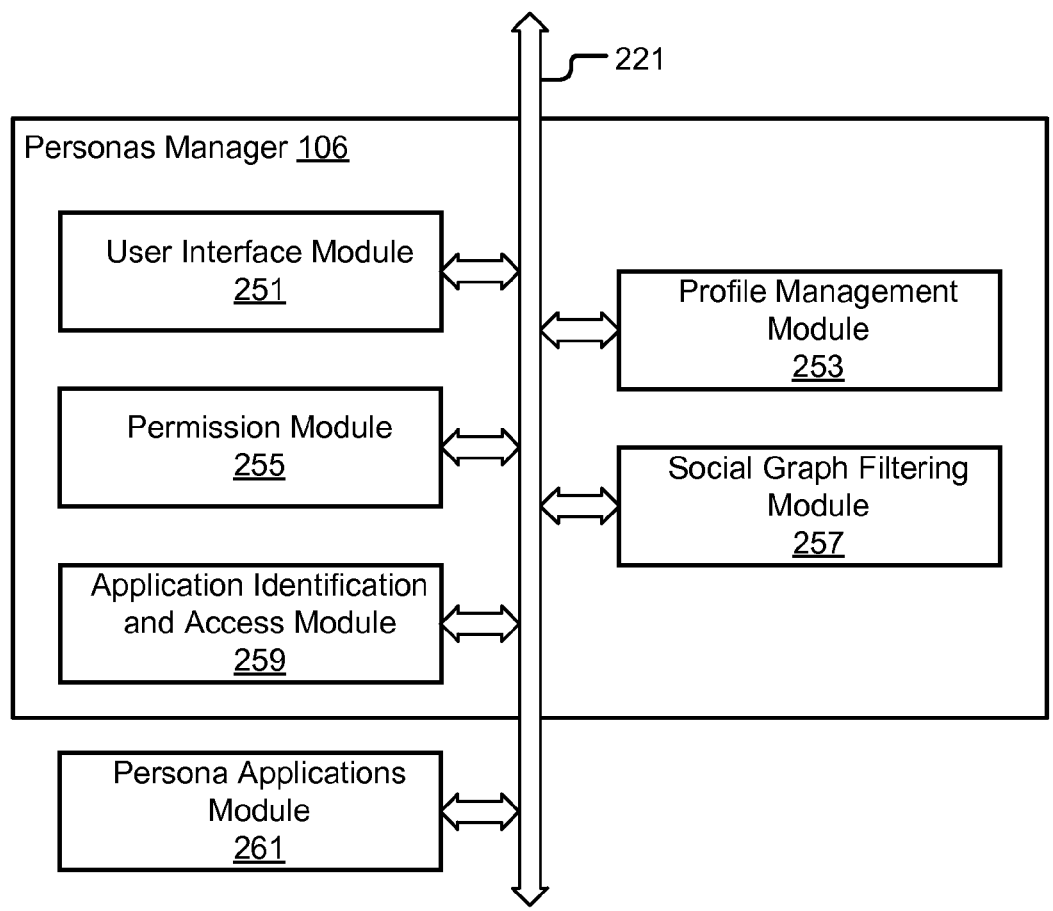
FIG. 2B is a block diagram illustrating the example personas manager and its software components.

Referring now to FIG. 2B, like reference numerals have been used to reference like components with the same or similar functionality that is described above with reference to FIGS. 1 and 2A. As those components have been described above, the description relating to them is not repeated here. The personas manager (106a, 106b, or 106c), indicated here by reference numeral 250, include various applications or engines that are programmed to perform the functionalities described here. The personas manager 106a,

106*b*, or 106*c*, creates, incorporates, or provides "multiple" personas, any one or more of which a user may select. In some instances, a persona is a social role or function in society. This role or function either refers to an interest or hobby (e.g., watching movies, skateboarding etc.), identity (e.g., being a parent, bachelor, celebrity etc.), or profession or hobby (e.g., photography, dancing, playing soccer etc.). A user may elect to have multiple personas, depending on various criteria. Every persona type created or provided by the personas manager 106*a*, 106*b*, or 106*c*, has profile data specific to the persona type and applications associated with it. Depending on the context of a persona type, a user's list of friends may be filtered to include only those friends who are relevant to the persona type. For example, if the context of a persona type for a particular user is that he or she is a gamer, the particular user is only provided with a list of friends who are gamers, i.e., have a "gamer" persona.

In some instances, a persona may reflect a community, one that is all-encompassing, for example, all users of an online community, or one based on demographics. For example, users in the same country, age group, same religion, etc. A persona may be based on a fantasy (e.g., pirates or vampires) or on an activity (e.g., barbeques, people watching etc.).

The personas manager 106*a*, 106*b*, or 106*c* includes a user interface module 251, via which particular users may join one or more personas. The user interface module 251 is software including routines for establishing or managing a user interface. In some implementations, the user interface module 251 may be a set of instructions executable by the processor 235 to provide the functionality described below for managing a user interface. In some implementations, the personas manager 106 including the user interface module 251 may be stored in the memory 237 of the social network 102 or third party server 134 and may be accessible and executable by the processor 235. In either implementation, the user interface module 251 may be adapted for cooperation and communication with the processor 235, the communication unit 241, data storage 239, and other components of the personas manager 106 (also indicated by reference numeral 250) via the bus 221.

A particular user may join "multiple" personas. In some implementations, there may be a limit imposed on how many personas a user may join, for example, at any given time or otherwise. In some instances, the number of personas that a particular user may join may be revealed gradually, for example, upon determining user interests. Personas may be created by the "administrators" of the social network servers 102 (a through n) or the users 125 (a through n). In some implementations, both the administrators of the social network servers 102 (a through n) and the users 125 (a through n) may have capabilities for creating personas. Users may create personas by requesting the social network servers 102 (a through n) for other persona types that may not be available or offered.

The user interface module 251 provides a navigational element to allow a user to switch between personas (i.e., change the "current" persona to another), which is described in greater detail below. Components like the user profile, friends list, applications, user groups etc., are filtered or selected depending upon the "current" persona type for a particular user.

The personas manager 106 (a through n) further includes a profile management module 253 for managing user profiles. The profile management module 253 is software including routines for managing user profiles. In some implementations, the profile management module 253 may be a set of instructions executable by the processor 235 to provide the functionality described below for managing user profiles. In some implementations, the personas manager 106 including the profile management module 253 may be stored in the memory 237 of the social network 102 or third party server 134 and may be accessible and executable by the processor 235. In either implementation, the profile management module 253 may be adapted for cooperation and communication with the processor 235, the communication unit 241, data storage 239, and other components of the personas manager 106 (also indicated by reference numeral 250) via the bus 221.

A user profile in a social network is a collection of data associated with any particular user. A user's profile may include a person's characteristics as well as preferences. The profile metadata includes the particular user's characteristics as well as preferences. Profile metadata is the data that describes the information about the user profile. The profile metadata depends on the nature of the service. For example, the type of profile data on a professional network may be different than on a dating network, but they may share similarities. Personas may take into account the variety of profile metadata associated with a persona. Each persona may have persona information that is specific and related to the context of a persona type. Multiple personas may have data in common. For example, the persona types for both a "music fan" and a "musician" may have "favorite music genre" in their metadata. As another example, a persona type for a "food lover" and a "traveler" may have favorite restaurants in their metadata. Every persona profile may be different as it serves a unique purpose; yet, some of the profile data may overlap and may be shared across persona types.

The personas manager 106 (a through c) includes a permission module 255, which manages user privacy, by seeking user permission or consent before retrieving profile information. The permission module 255 is software including routines for managing permissions. In some implementations, the permission module 255 may be a set of instructions executable by the processor 235 to provide the functionality described below for managing permissions. In some implementations, the personas manager 106 including the permission module 255 may be stored in the memory 237 of the social network 102 or third party server 134 and may be accessible and executable by the processor 235. In either implementation, the permission module 255 may be adapted for cooperation and communication with the processor 235, the communication unit 241, data storage 239, and other components of the personas manager 106 (also indicated by reference numeral 250) via the bus 221.

A social graph filtering module 257 determines the social graph data that is relevant to a particular persona type and filters social graph data based on the particular user type. It identifies and provides profiles for only those users who are relevant to the particular persona. The social graph filtering module 257 is software including routines for determining social graph data that is relevant to a particular user and filtering it. In some implementations, the social graph filtering module 257 may be a set of instructions executable by the processor 235 to provide the functionality described below for determining and filtering social graph data. In some implementations, the personas manager 106 including the social graph filtering module 257 may be stored in the memory 237 of the social network 102 or third party server 134 and may be accessible and executable by the processor 235. In either implementation, the social graph filtering module 257 may be adapted for cooperation and communication with the processor 235, the communication unit 241, data storage 239, and other components of the personas manager 106 (also indicated by reference numeral 250) via the bus 221.

The social network servers 102a through 102n provide tools or services configured to permit users to manage their profiles and communications with other users. These tools or services may include applications to perform other specific tasks, for example, share pictures, play games, shop on particular websites, edit documents, and so on. These tools and services are configured to support each persona type and perform the tasks as related to each persona type. An application identification and access module 259 performs the tasks of identifying a particular application for a particular user, for example, by which the particular user may want to share photographs of a special event, and provide access to the particular user to actually upload and share the photographs.

The application identification and access module 259 may be software including routines for identifying an application specific to a particular persona and providing access to it. In some implementations, application identification and access module 259 may be a set of instructions executable by the processor 235 to provide the functionality described below for identifying and accessing an application. In some implementations, the personas manager 106 including application identification and access module 259 may be stored in the memory 237 of the social network 102 or third party server 134 and may be accessible and executable by the processor 235. In either implementation, application identification and access module 259 may be adapted for cooperation and communication with the processor 235, the communication unit 241, data storage 239, and other components of the personas manager 106 (also indicated by reference numeral 250) via the bus 221.

The personas manager 106 (a, b, or c) includes persona applications 261 configured as a module or an engine, which permits the particular user to use one or more applications that he or she desires to perform activities that are desired. The persona applications 261 may be software including routines for providing or managing a variety of persona-specific applications. In some implementations, persona applications 261 may be a set of instructions executable by the processor 235 to provide the functionality described below for providing or managing applications. In some implementations, the persona applications 261 may be stored in the memory 237 of the social network 102 or third party server 134 and may be accessible and executable by the processor 235. In either implementation, the persona applications 261 may be adapted for cooperation and communication with the processor 235, the communication unit 241, data storage 239, and other components of the personas manager 106 (also indicated by reference numeral 250) via the bus 221.

In some implementations, a user profile on a social network includes a set of the user's connections. The set of connections is typically referred to as a "friends list." A connection links to another user in the social network. Connections may be managed by the profile management module 253 and the social graph filtering module 257. In some implementations, each persona may have the connection set defined separately. A particular user 125a through 125n may have one main connection list that includes all connections. When the user (125a through 125n) switches to a particular persona type, only other user connections that have also joined that persona may be exposed. A user may have one main connection that may include all the connections. The social graph filtering module 257 may algorithmically filter this list depending on the persona type. Therefore, the communications between users may be specific to a particular persona. As one example, if a particular user sends a message to another user, which may be business related (e.g., on a professional persona) or show a romantic interest (e.g., dating persona), the social graph filtering module 257 associates each message to a particular persona type.

Personas may be created for individuals as well as groups. A "group" on a social network may bring users together, for example, those who share a common interest. Groups may provide multiple users with some functionality, for example, sharing content (e.g., photographs or videos), communications, and managing events. On a social network that incorporates multiple personas, there may be several approaches to creating and providing personas. For example, a group may be associated with a single persona. When a particular user switches to a particular persona, only the groups associated with that persona type are displayed. A group may belong to multiple personas. For instance, a group called "jogging tips" may belong to persona types named "Fitness Buff" and "Health Enthusiast."

A particular persona type may have a set of applications that are appropriate within the context of a persona. As one example, a professional persona may have a set of applications tailored for business networking. As another example, a "movie fan" persona may have applications tailored for movie lovers etc. A single application may be modified slightly and may be used for multiple personas. For example, a "locations" application that allows users to enter, rate, and review locations may be used on the "Foodie," "Dog Lover," and "Scuba Diver" personas. The locations in "Foodie" may correspond to restaurants, the locations in "Dog Lovers," may correspond to dog parks, vets, pet stores, and the locations in "Scuba Divers" may correspond to scuba diving spots.

A "photo" application to share pictures may be used with the "Traveler" persona to share travel photos, a "Dog Lover" persona to share pictures about dogs, and a "Fisherman" persona to share pictures related to fishing. A "collection" application that allows users to enter, rate, and review items may be used with the "Music Fan" persona for gathering items from musicians, a "Reader" persona for accumulating books, and a "Video Gamer" persona for accumulating video games.

The user interface module 251, the profile management module 253, the permission module 255, the social graph filtering module 257, the application identification and access module 259 of the personas managers 106a and 106c and the persona applications 261 communicate over the software communication mechanism 221. Software communication mechanism 221 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication may be implemented on any underlying hardware, for example, a network, the Internet, a bus 220 (FIG. 2A), a combination thereof, etc.

Figure 3A:
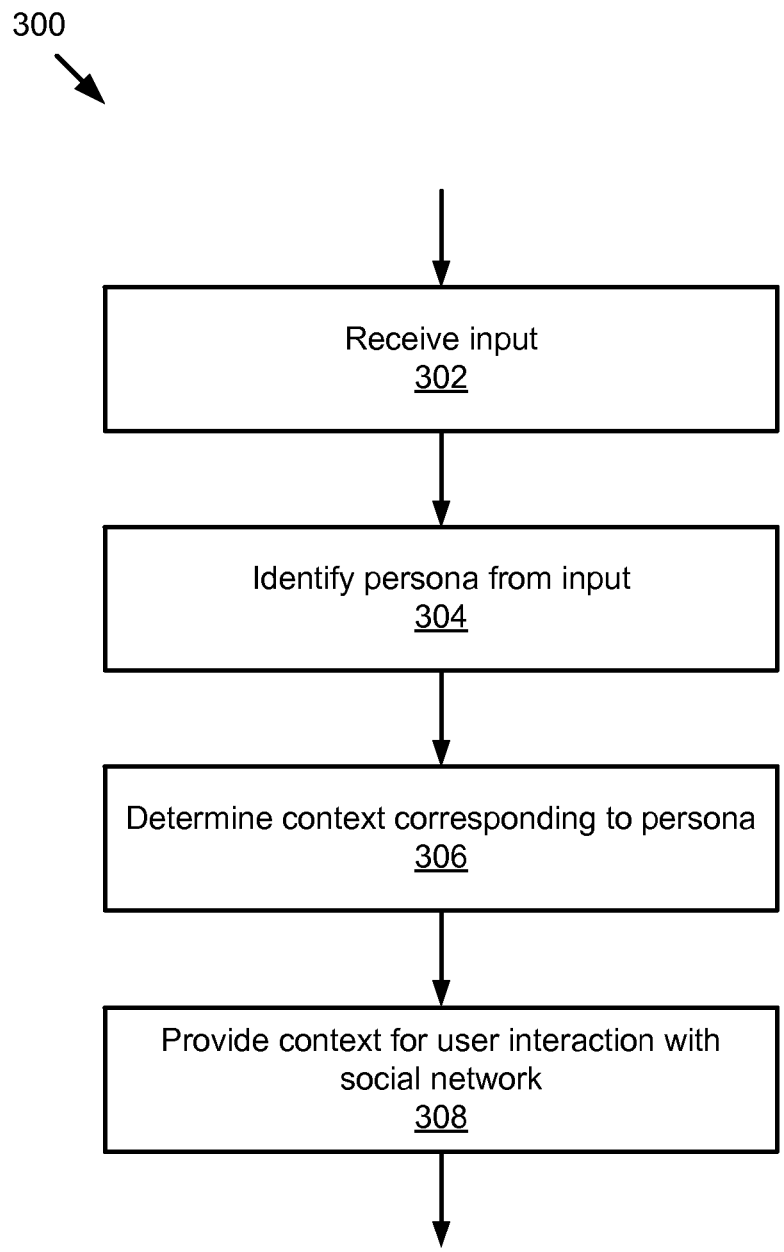
FIG. 3A is a flow chart of an example method for providing a context for interaction based on a persona (or persona type).

Referring now to FIG. 3A, an example method for providing a context for interaction based on a persona (or persona type) will be described and indicated generally by reference numeral 300. The method 300 begins with the personas manager 106 receiving 302 input from the user 125, for example, via a user device 115. In some implementations, the user logs into a social network and selects a persona which they want to use to interact with the social network. Based upon the login process, the identity of the user can be determined by the personas manager 106. The user may have one or more personas associated with the login. For example, a particular user may have a first persona that is as a gamer, second persona that is as a foodie, and the third persona that is a physician. The user can also input the selection of a particular persona that the user wishes to use in interacting with the social network. The method continues by identifying 304 a persona from the user input. Next the method 300 determines 306 a context corresponding to the persona identified in block 304. As noted above, an interaction context may include one or more of applications, social graphs, groups, connections, user interfaces, profiles, communication and content. One example method 306 for determining and interaction context is described below with reference to FIG. 3B. For example, the injured action context may require selection of applications appropriate for the selected persona, modification of social the social graph to show connections of other users that have the same persona, a user interface specifically adapted to the persona, and additional or different profile information based on the persona. Extending the example above, if the user selects the gamer persona then their profile may include additional information about particular game platforms that they are knowledgeable or well practiced in. However, if the foodie persona is selected the profile may include different types of food which they have enjoyed or are their favorites. Similarly, if the physician persona is selected different profile information, for example, where they attended medical school, a medical specialty, etc. may be included in the profile. Similarly, depending on the persona selected different versions of applications, social graphs, groups, connections, user interfaces, profiles, communication and content are included in the interaction context without persona. Next, the method 300 continues by providing 308 the context specific to the identified persona for user interaction with the social network. Thus, the present technology is particularly advantageous because depending on the persona that is selected the interaction context is specifically adapted to that persona. For example, different user interfaces for different personas may have a different look and feel as well as include different information and offer different functionality.

Figure 3B:
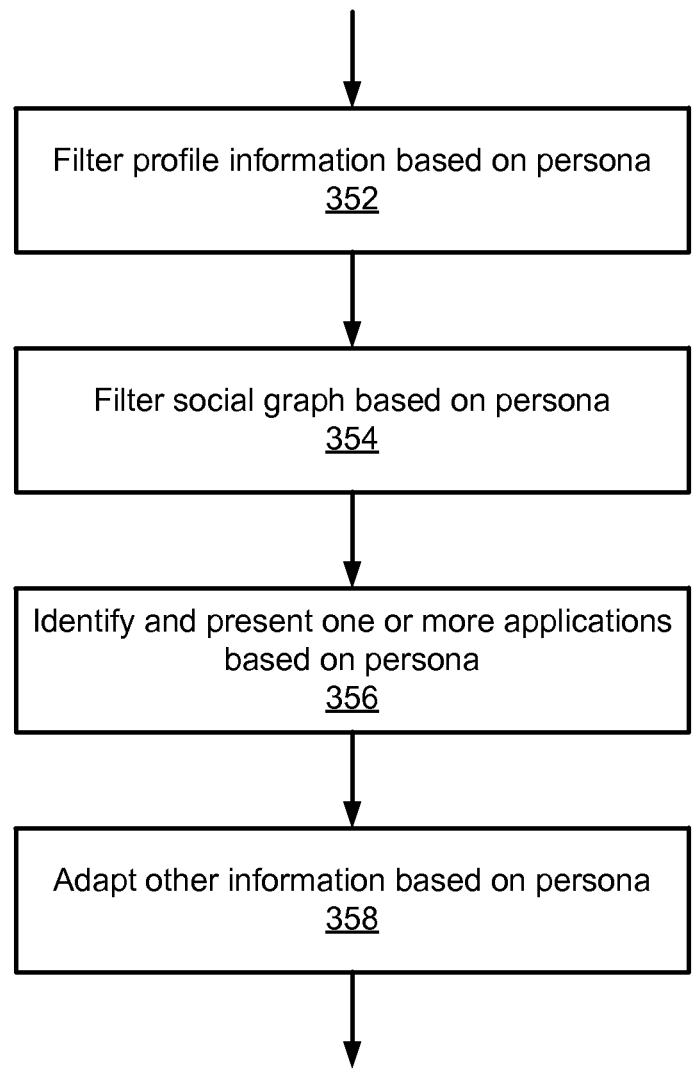
FIG. 3B is a flow chart of an example method for filtering information based on a persona (or persona type).

Referring now to FIG. 3B, an example method for filtering information based on a persona is illustrated and indicated generally by reference numeral 306. It should be understood that the operations illustrated in FIG. 3B is merely by way of example and that the operations may be performed in different orders than those that are illustrated and some operations may be excluded, and different combinations of the operations may be performed. The social network 102a through 102n is configured to create, incorporate, or provide multiple personas to its users. The method 306 indicated by reference numeral 306 may include at block 352 one or more operations for filtering profile information based on a persona (selected from multiple persona types that are offered users, which they may join when they join a social network 102a through 102n or access it). From there, the method 306 proceeds to block 354 and may include one or more operations for filtering a social graph based on the persona of a particular user. As indicated above, only those users with whom the particular user is connected and who share the persona type are filtered and displayed to the particular user. From there, the method 306 proceeds to block 356 and may include one or more operations for identifying and presenting applications based on the persona. In other words, the applications are configured for use with a specific persona type. The method 306 continues to block 358 and may include one or more operations for adapting other information, actions, or functionality based upon the selected persona. For example, contact groups, connections, user interfaces, communication, content, etc. maybe adapted to the selected persona.

Figure 4:
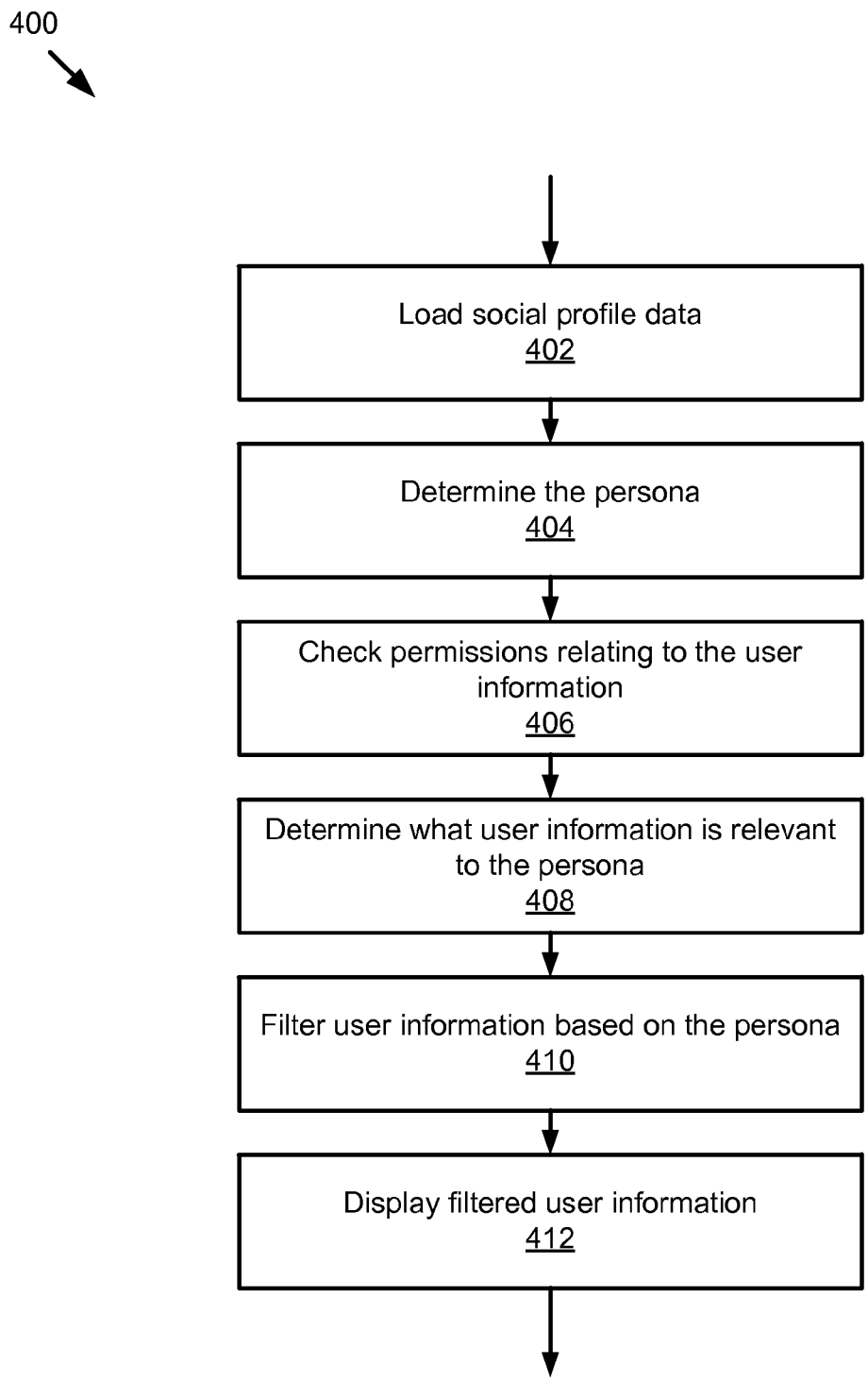
FIG. 4 is a flow chart of an example method for profile management.

FIG. 4 illustrates an example method for profile management indicated generally by reference numeral 400. The method 400 may include one or more operations indicated by block 402 for loading social profile data for a particular user. It should be understood that the operations illustrated in FIG. 4 is merely by way of example and that the operations may be performed in different orders than those that are illustrated and some operations may be excluded, and different combinations of the operations may be performed. The method 400 proceeds to block 404, where it may include one or more operations for determining the persona that a particular user has indicated. The method 400 proceeds to block 406 and may include one or more operations for checking permissions relating to user information. For example, before retrieving any information on a particular user, the method 400 checks to see that the necessary permissions were obtained or managed. The method 400 proceeds to the next block 408, and may include one or more operations to determine the user information that is relevant to the persona. From there, the method 400 proceeds to the next block 410, and may include one or more operations to filter user information (content) based on the persona type. From there, the method 400 proceeds to the next block 410 and may include one or more operations for filtering user information based on the persona. The method 400 proceeds to the next block 412, where the method may include one or more operations for displaying filtered user information to a particular user (filtered by the persona type indicated for the particular user).

Figure 5:
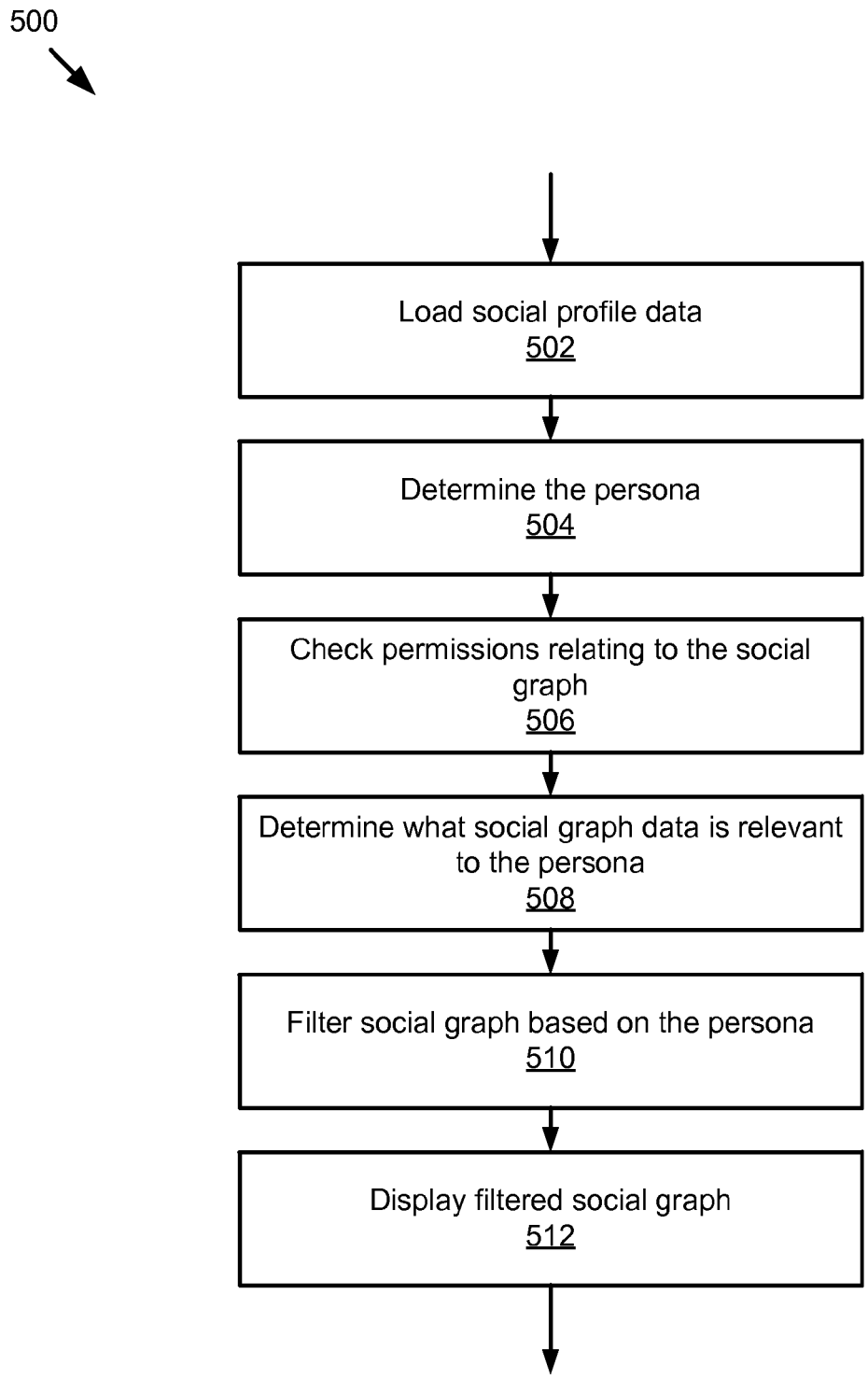
FIG. 5 is a flow chart of an example method for filtering via a social graph.

FIG. 5 illustrates an example method indicated by reference numeral 500 for filtering a social graph. The method 500 may include one or more operations at block 502 for loading social profile data relating to particular users. It should be understood that the operations illustrated in FIG. 5 is merely by way of example and that the operations may be performed in different orders than those that are illustrated and some operations may be excluded, and different combinations of the operations may be performed. The method 500 proceeds to the next block 504, at which point, the persona (type of persona, for example, whether actor, artist, or comedian) may be determined. The method 500 proceeds to the next block 506, and may include one or more operations for checking permissions of the social graph (for example, to determine if each of the particular user's friends share or indicate the same persona type). The method 500 proceeds to the next block 508 and may include one or more operations for determining social graph data that is relevant to the persona. From there, the method 500 proceeds to the next block 510 and may include one or more operations for filtering a social graph (i.e., user connections) based on the persona type. The method 500 proceeds to the next block 512, and may include one or more operations for displaying the filtered social graph.

Figure 6:
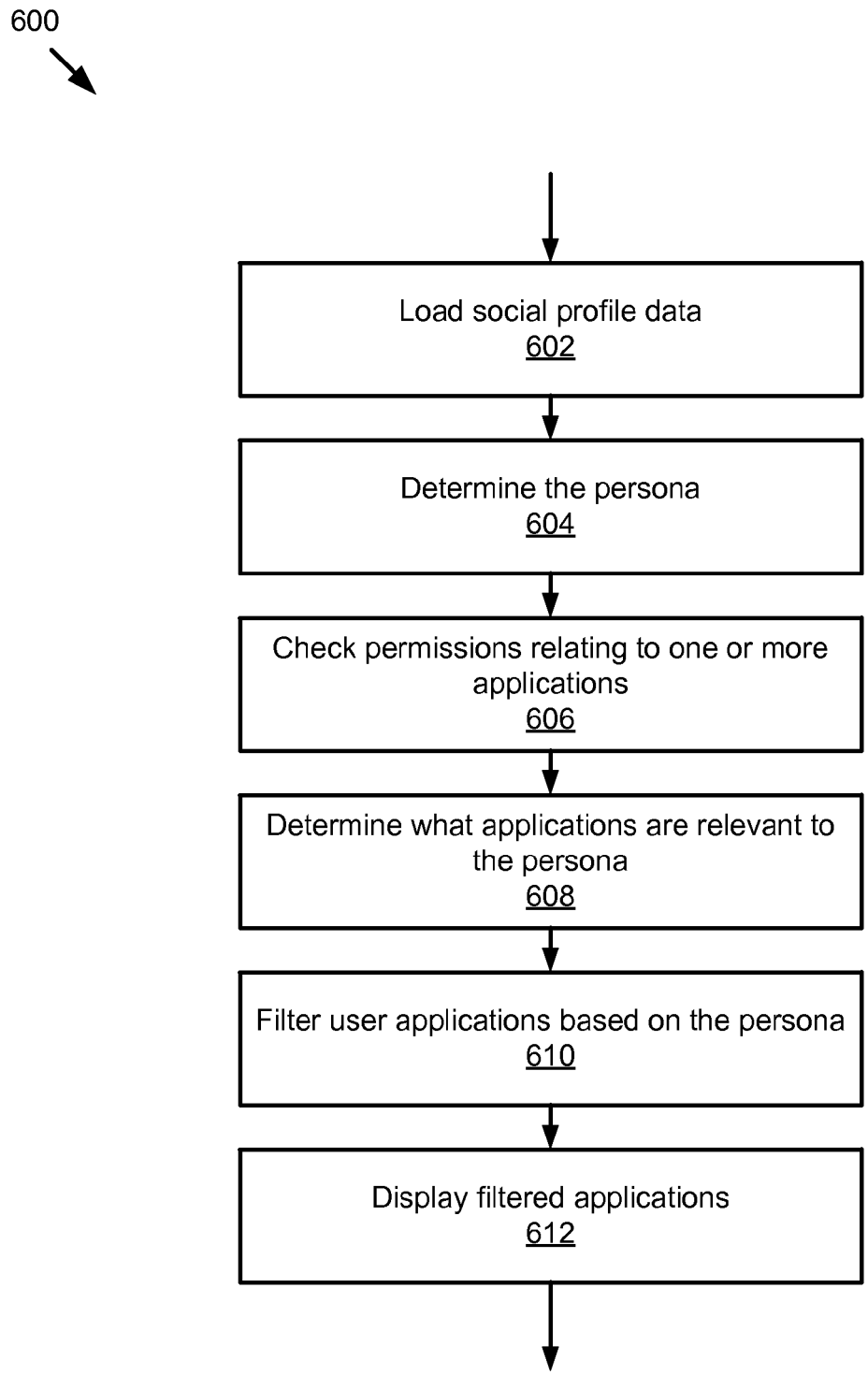
FIG. 6 is a flow chart of an example method for identification and presentation of applications.

FIG. 6 illustrates an example method for identification and presentation of applications indicated by reference numeral 600. The method 600, at block 602, may include one or more operations for loading social profile data for particular users. It should be understood that the operations illustrated in FIG. 6 is merely by way of example and that the operations may be performed in different orders than those that are illustrated and some operations may be excluded, and different combinations of the operations may be performed. The method proceeds to the next block 604, and may include one or more operations for determining the persona. The method proceeds to the next block 606, and may include one or more operations for checking permissions of the applications. From there, the method proceeds to the next block 608, and may include one or more operations for determining the applications that are relevant to the persona. The method proceeds to the next block 610, and may include one or more operations to filter user applications based on the persona. The method proceeds to the next block 612, and may include one or more operations for providing a display of filtered applications (filtered by the persona).

Figure 7A:
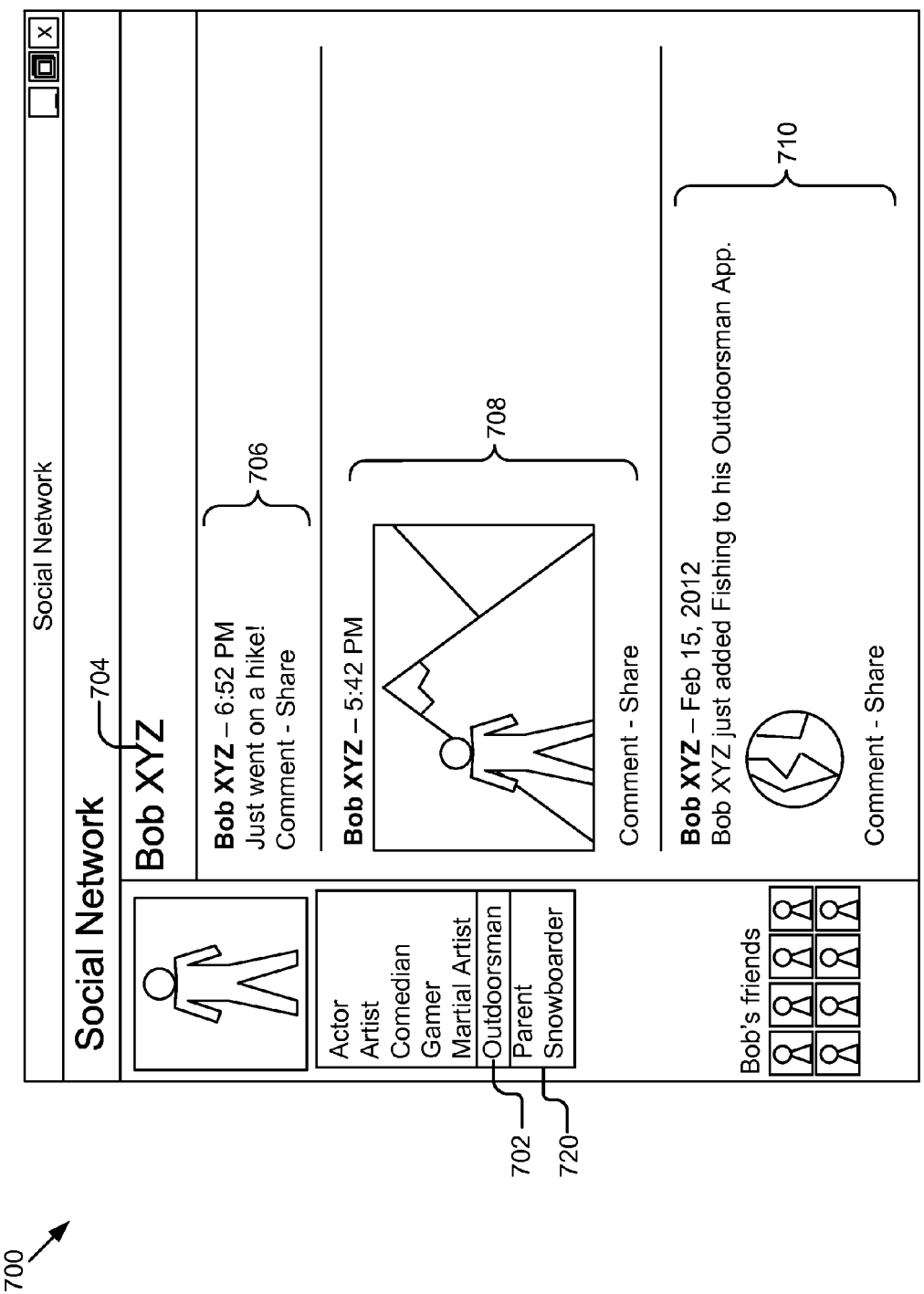
FIG. 7A is a graphic representation of an example user interface illustrating different persona types for a particular user, with an indication of a current persona type ("Outdoorsman").

FIG. 7A is a graphic representation of an example user interface indicated generally by reference numeral 700, for changing personas illustrating different personas for a particular user. As one example, a particular user Bob XYZ 704 belongs to a social network. The user interface 700 indicates a list of persona types, indicated by reference numeral 702, which Bob has joined, for example—"Actor," "Artist," "Comedian," "Gamer," "Martial Artist," "Outdoorsman," "Parent," "Snowboarder," or the like. The user interface 700 is configured to display the particular persona type 702, selected by Bob XYZ, which in this instance is "Outdoorsman." Because this persona type serves as a filter, the user interface 700 may display posts relating to this persona type, indicated at 706, which specifies Bob XYZ's interest in outdoor activities. The user interface 700 may filter and provide for display in an area 708, photographs or other visual indicia relating to the persona type. The user interface 700 may include options for adding activities to the application associated with the particular persona type "Outdoorsman," as indicated by reference numeral 710.

Figure 7B:
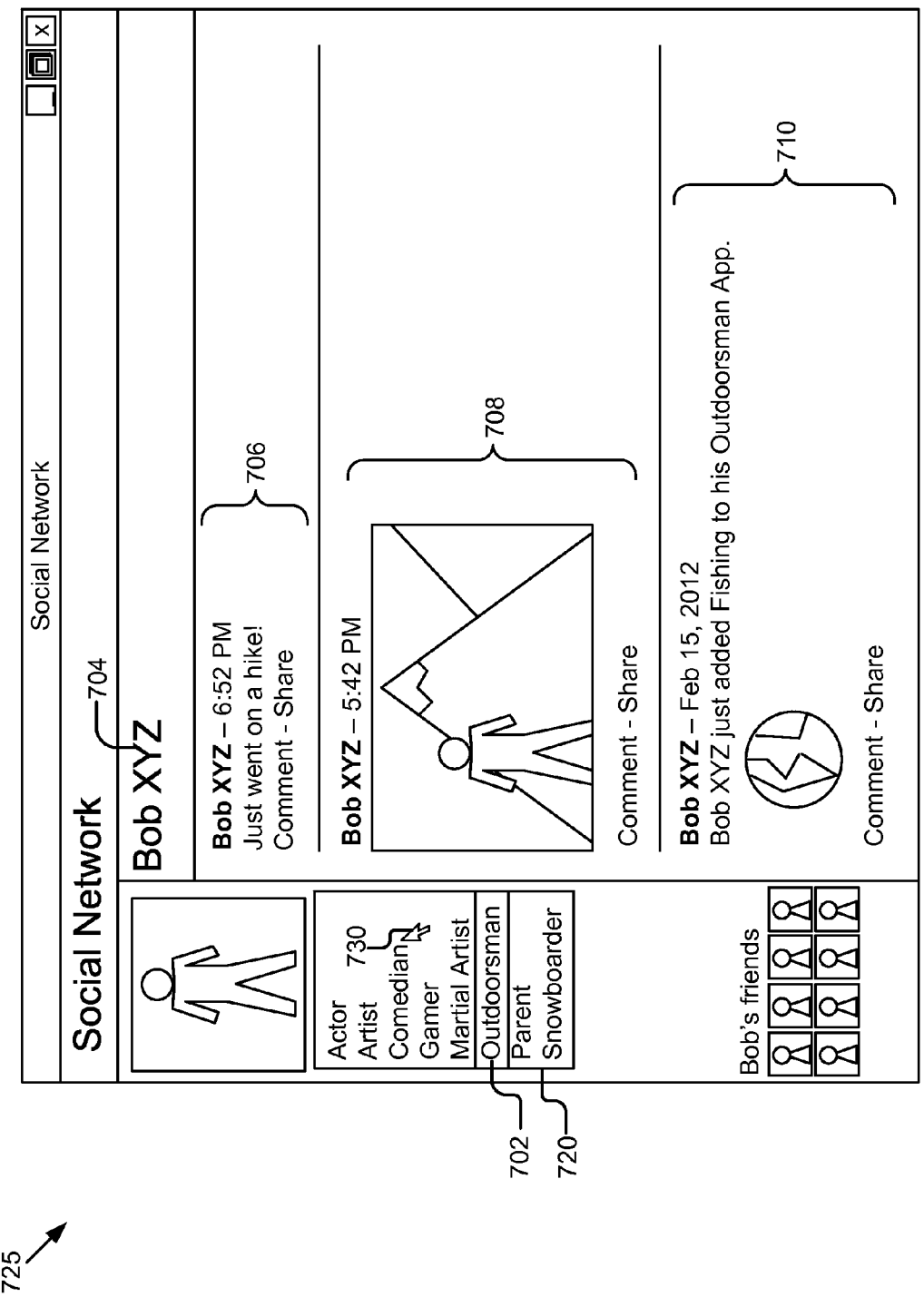
FIG. 7B is a graphic representation of an example user interface illustrating different persona types for a particular user, with an indication of a current persona type ("Outdoorsman"), and a navigational element to effect a change to another persona type.

FIG. 7B is a graphic representation of an example user interface indicated by reference numeral 725, for effecting a change or switching personas. Again, in the illustrated example, a particular user Bob XYZ indicated by reference numeral 704 belongs to a social network. The user interface 725 indicates a list of persona types, indicated by reference numeral 720, that Bob has joined, for example—"Actor," "Artist," "Comedian," "Gamer," "Martial Artist," "Outdoorsman," "Parent," "Snowboarder," or the like. The user interface 725 is configured to display the current particular persona type 702, which in this instance, is "Outdoorsman." Because this persona type serves as a filter, the user interface 725 may display posts relating to this activity, as indicated by reference numeral 706. The user interface 700 may filter and provide for display in an area 708, photographs or other visual indicia (e.g., of a hike in the mountains) relating to the persona type. The user interface 725 may include options for adding one or more activities (in this example, "Fishing") to the application associated with the current persona type, in this example, "Outdoorsman." This is indicated by reference numeral 710. As indicated by a navigational element 730, the user interface is configured to effect a change of persona, from "Outdoorsman" to "Comedian."

Figure 7C:
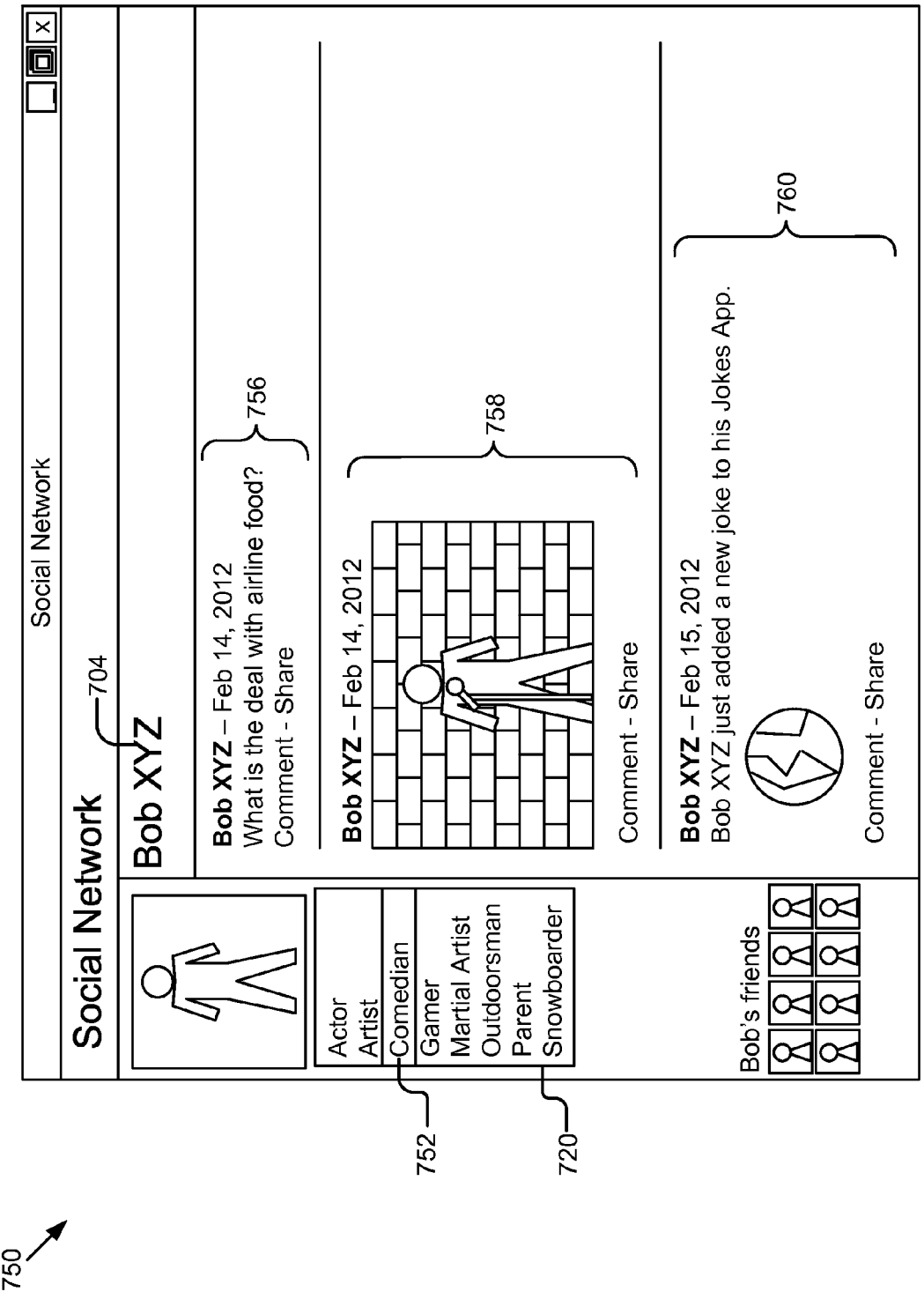
FIG. 7C is a graphic representation of an example user interface illustrating different persona types with a change effected to indicate a new persona type ("Comedian" instead of "Outdoorsman").

FIG. 7C is a graphic representation of an example user interface indicated generally by reference numeral 750 for changing personas, illustrating a change from one persona (in FIGS. 7A and 7B) to another (illustrated in FIG. 7C). Again, in the illustrated example, a particular user Bob XYZ 704 belongs to a social network. The user interface 725 indicates a list of persona types, indicated by reference numeral 702, which Bob has joined, for example—"Actor," "Artist," "Comedian," "Gamer," "Martial Artist," "Outdoorsman," "Parent," "Snowboarder," or the like. The user interface 725 is configured to display the current particular persona type 752, which in this instance, is "Comedian." Because this persona type serves as a filter, the user interface 750 may display posts relating to this activity, as indicated by reference numeral 756. The user interface 750 may filter and provide for display in an area 758, photographs or other visual indicia (e.g., of Bob XYZ before an audience) relating to the persona type. The user interface 750 may include options for adding information via an application associated with a particular persona type, in this example, a new joke as indicated by reference numeral 760.

In the above description, for purposes of explanation, numerous specific details are indicated in order to provide a thorough understanding of the technology described. It should be apparent, however, that this technology may be practiced without these specific details. In other instances, structures and devices are shown in block diagram form in order to avoid obscuring the technology. For example, the present technology is described with some implementations below, with reference to user interfaces and particular hardware. However, the present technology applies to any type of computing device that may receive data and commands, and any devices providing services.

Moreover, the present technology is described above primarily in the context of creating and providing personas in social networks for the purpose of filtering connections, content, and applications, relating to users of the social networks, based on the personas; however, the present technology may apply to any type of online communities and other applications beyond just online communities. In particular, this technology for creating personas and filtering connections, content, and applications relating to the users of the social networks, based on persona types, may be used in other contexts besides social networks.

Reference in the specification to "one implementation or instance," "an implementation or instance," or "some implementations or instances" simply means that one or more particular features, structures, or characteristics, described in connection with the one or more implementations or instances is included in at least one or more implementations or instances that are described. Any appearance of the phrase "in one implementation or instance" in various places in the specification is not necessarily referring to the same implementation or instance.

Some portions of the detailed descriptions above are presented in terms of algorithms and symbolic representations of operations on data bits within a computer memory of either one or more computing devices. These algorithmic descriptions and representations are the means used in the data processing arts to most effectively convey the substance of their work to others. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing the terms "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some implementations, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that may include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

The algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a stand-alone program, as part of a larger program, as a plurality of separate programs, as a statically or dynamically linked library, as a kernel loadable module, as a device driver, and/or in every and any other way known now or in the future to those in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:
1. A method comprising:
providing a plurality of predefined persona types available for use by a plurality of users of a social network, a persona type from the plurality of predefined persona types representing an online community in the social network, the online community including the plurality of users having joined the online community by selecting a same persona of the persona type;
receiving input from a first user;
determining an interest of the first user;
identifying, using at least one computing device, the first user and a first persona type for the first user based on the received input and the interest, the first persona type being one from the plurality of predefined persona types;
identifying a first set of preassigned applications of the first persona type;
filtering the first set of preassigned applications of the first persona type to select a first filtered application;
modifying a functionality of the first filtered application to correspond with actions performable by the first user as a first persona of the first persona type;
determining a first context of the first persona type, the first context identifying a first online community including persona-specific content, a user interface, a connection with a second user that joined the online community by selecting the first persona of the first persona type, and the filtered application; and transmitting instructions to a client device that cause display of the first context to the first user for user interaction with the first online community in the social network.

2. The method of claim 1, wherein the first context also includes one or more from the group of a social graph, a contact group, a profile, communications and content specific to the first persona type.

3. The method of claim 1, wherein the user interface enables the first user to switch from the first context of the first persona type to a second context corresponding to a second persona type.

4. The method of claim 1, wherein determining the first context of the first persona type includes filtering, using the at least one computing device, connections of the user to other users in the social network, profile information and content, based on the first persona type.

5. The method of claim 1, wherein transmitting the instructions to the client device that cause the display of the first context to the first user includes transmitting instructions for displaying to the first user, using the at least one computing device, connections and content that are determined to be relevant to the first persona type in a specific user interface corresponding to the first persona type.

6. The method of claim 1, wherein determining the first context of the first persona type includes determining a communication between the first user and the second user in the first online community.

7. The method of claim 1, wherein identifying the first persona type for the first user includes selecting the first persona type for the first user based on one from a group of a user location, a user preference, a user interest, a user identity, a user role in society, and a user function in society.

8. A non-transitory computer readable medium storing instructions that when executed by one or more processors cause the one or more processors to perform operations comprising:
  providing a plurality of predefined persona types available for use by a plurality of users of a social network, a persona type from the plurality of predefined persona types representing an online community in the social network, the online community including the plurality of users having joined the online community by selecting a same persona of the persona type;
  receiving input from a first user;
  determining an interest of the first user;
  identifying, using at least one computing device, the first user and a first persona type for the first user based on the received input and the interest, the first persona type being one from the plurality of predefined persona types;
  identifying a first set of preassigned applications of the first persona type;
  filtering the first set of preassigned applications of the first persona type to select a first filtered application;
  modifying a functionality of the first filtered application to correspond with actions performable by the first user as a first persona of the first persona type;
  determining a first context of the first persona type, the first context identifying a first online community including persona-specific content, a user interface, a connection with a second user that joined the online community by selecting the first persona of the first persona type, and the filtered application; and transmitting instructions to a client device that cause display of the first context to the first user for user interaction with the first online community in the social network.

9. The non-transitory computer readable medium of claim 8 wherein the first context also includes one or more from the group of a social graph, a contact group, a profile, communications and content specific to the first persona type.

10. The non-transitory computer readable medium of claim 8 wherein the user interface enables the first user to switch from the first context of the first persona type to a second context corresponding to a second persona type.

11. The non-transitory computer readable medium of claim 8 wherein determining the first context of the first persona type includes filtering, using the at least one computing device, connections of the user to other users in the social network, profile information and content, based on the first persona type.

12. The non-transitory computer readable medium of claim 8 wherein transmitting the instructions to the client device that cause the display of the first context to the first user includes transmitting instructions for displaying to the first user, using the at least one computing device, connections and content that are determined to be relevant to the first persona type in a specific user interface corresponding to the first persona type.

13. The non-transitory computer readable medium of claim 8 wherein determining the first context of the first persona type includes determining a communication between the first user and the second user in the first online community.

14. The non-transitory computer readable medium of claim 8 wherein identifying the first persona type for the first user includes selecting the first persona type for the first user based on one from a group of a user location, a user preference, a user interest, a user identity, a user role in society, and a user function in society.

15. A system including one or more processors and a memory configured to perform operations comprising:
  providing a plurality of predefined persona types available for use by a plurality of users of a social network, a persona type from the plurality of predefined persona types representing an online community in the social network, the online community including the plurality of users having joined the online community by selecting a same persona of the persona type;
  receiving input from a first user;
  determining an interest of the first user;
  identifying, using at least one computing device, the first user and a first persona type for the first user based on the received input and the interest, the first persona type being one from the plurality of predefined persona types;
  identifying a first set of preassigned applications of the first persona type;
  filtering the first set of preassigned applications of the first persona type to select a first filtered application;
  modifying a functionality of the first filtered application to correspond with actions performable by the first user as a first persona of the first persona type;
  determining a first context of the first persona type, the first context identifying a first online community including persona-specific content, a user interface, a connection with a second user that joined the online community by selecting the first persona of the first persona type, and the filtered application; and transmitting instructions to a client device that cause display of the first context to the first user for user interaction with the first online community in the social network.

16. The system according to claim 15, wherein the first context also includes one or more from the group of a social graph, a contact group, a profile, communications and content specific to the first persona type.

17. The system according to claim 15, wherein the user interface enables the first user to switch from the first context of the first persona type to a second context corresponding to a second persona type.

18. The system according to claim 15, wherein determining the first context of the first persona type includes filtering, using the at least one computing device, connections of the user to other users in the social network, profile information and content, based on the first persona type.

19. The system according to claim 15, wherein transmitting the instructions to the client device that cause the display of the first context to the first user includes transmitting instructions for displaying to the first user, using the at least one computing device, connections and content that are determined to be relevant to the first persona type in a specific user interface corresponding to the first persona type.

20. The system according to claim 15, wherein determining the first context of the first persona type includes determining a communication between the first user and the second user in the first online community.

21. The system according to claim 15, wherein identifying the first persona type for the first user includes selecting the first persona type for the first user based on one from a group of a user location, a user preference, a user interest, a user identity, a user role in society, and a user function in society.

* * * * *